Dec. 10, 1935.  B. C. ROLFE  2,023,936
OIL LEVEL ACTUATED ENGINE SPEED CONTROLLING DEVICE
Filed June 4, 1934   2 Sheets-Sheet 1

Inventor
Benjamin C. Rolfe,
By Mawhinney & Mawhinney,
Attorneys

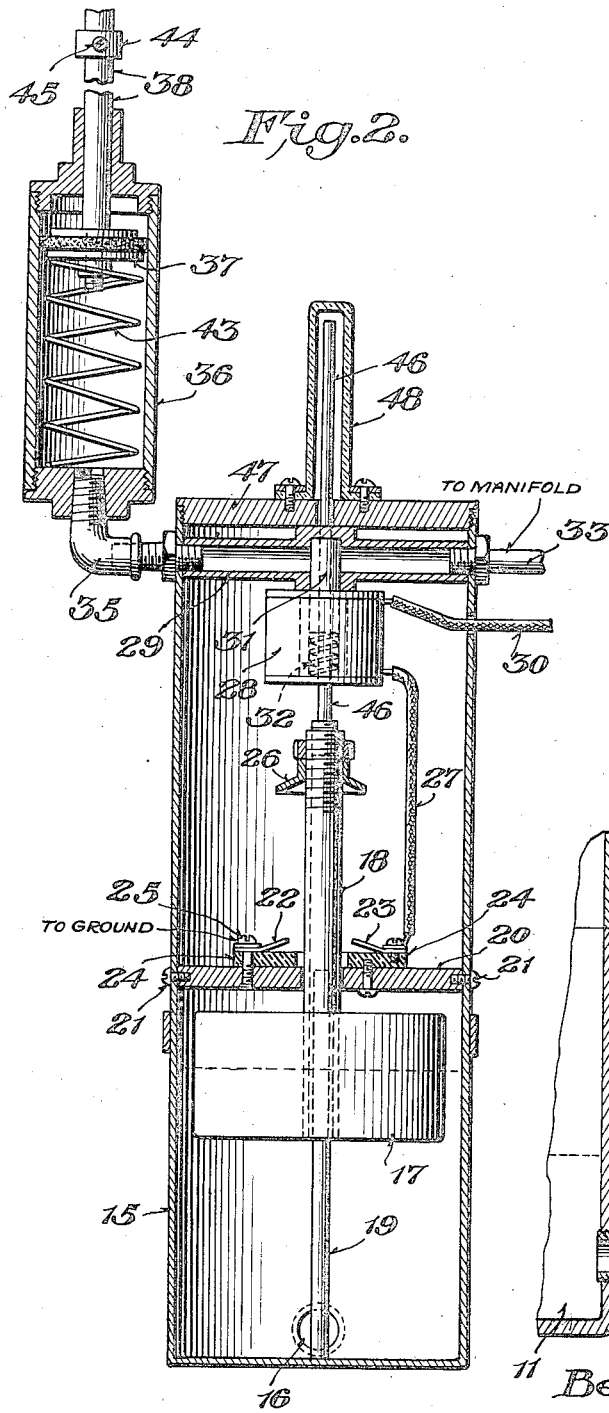
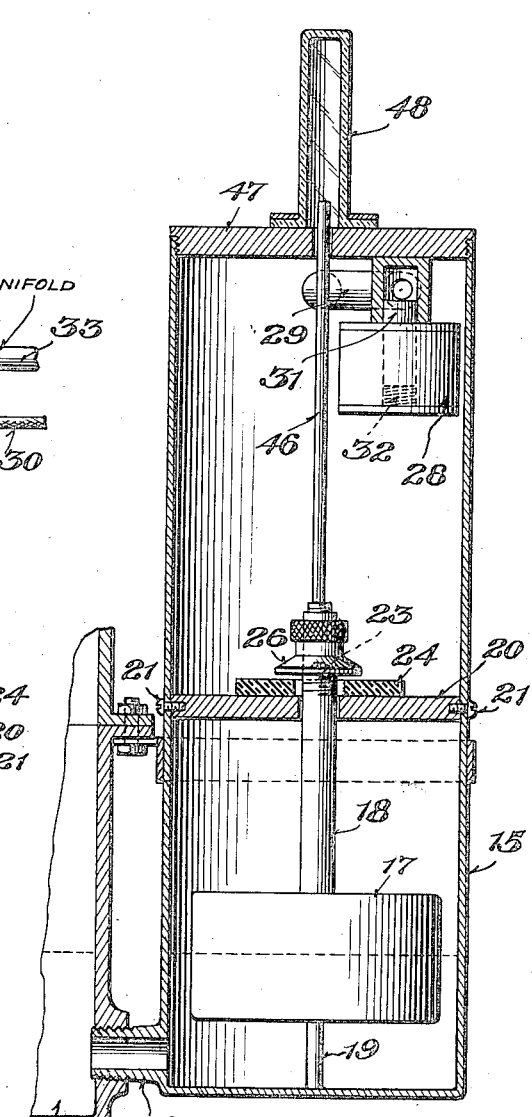

Patented Dec. 10, 1935

2,023,936

UNITED STATES PATENT OFFICE 2,023,936

OIL LEVEL ACTUATED ENGINE SPEED CONTROLLING DEVICE

Benjamin C. Rolfe, Richmond, Va.

Application June 4, 1934, Serial No. 729,040

9 Claims. (Cl. 123—108)

The present invention relates to an improved device for controlling the operation of engines by the surface level of the oil in the crank case, and has for an object to provide a device which is operable when the surface level of the oil drops below a predetermined point to reduce the speed of the engine to a degree sufficient to permit limited operation of the motor and thus insure that the bearings and other parts of the motor will not be burned out from insufficient supply of the lubricant.

Heretofore various attempts have been made to prevent damage to internal combustion engines when the supply of oil in the crank case becomes exhausted or depleted to a dangerous point. In these prior devices the ignition current has been broken or other means employed to completely shut down the operation of the engine but such devices are found to meet various obstacles in use as when the oil supply is diminished to a dangerous extent the engine need not be completely shut off but may be safely operated at a reduced speed for a limited period of time or until the oil supply may be replenished.

Another object of the present invention is to provide a device which is entirely automatic in action, which is operated by the fall of the surface level of the lubricant in the crank case, and which does not interfere with the ignition system or other operating parts of the motor but merely reduces the fuel mixture supply to the intake manifold to prevent the operation of the motor beyond a predetermined safe speed to prevent burning out of the bearings and other parts.

Another object of the invention is to provide a supplemental throttle valve which may normally remain in full open position, so that the engine may be controlled by the usual throttle valve and other operating parts, and wherein when the oil level drops to a predetermined extent the supplemental throttle valve will be closed irrespective of the usual controls for the engine and to a desired extent to prevent passage of the fuel mixture through the manifold to the engine beyond a predetermined rate.

In accomplishing this result the invention contemplates the utilization of the suction in the manifold under the control of the device for closing the supplemental throttle valve to the desired extent, and the invention also embodies certain means for admitting adjustment of the supplemental throttle valve in its partially closed position so that the reduced speed may be commensurate with the throttle in the surface level of the oil in the crank case and sufficient to admit of the restricted continuous operation of the engine.

A prime purpose of the invention therefore is to prevent operation of the motor, such as in an automobile, at higher speeds when the surface level of the oil in the crank case drops to a predetermined danger line and so that under these conditions the bearings and other parts of the motor are protected from burning out or abuse.

The invention also aims to provide an engine controlling device of this character which is sealed or enclosed so that it cannot be tampered with, thus protecting the engine after the crank case body of oil has been consumed to a dangerous degree.

Figure 2 is an enlarged longitudinal section taken through the body portion of the controlling device, showing the same in normally inoperative position.

Figure 3 is a longitudinal section taken centrally through the device axially at right angles to Figure 2.

Figure 1:
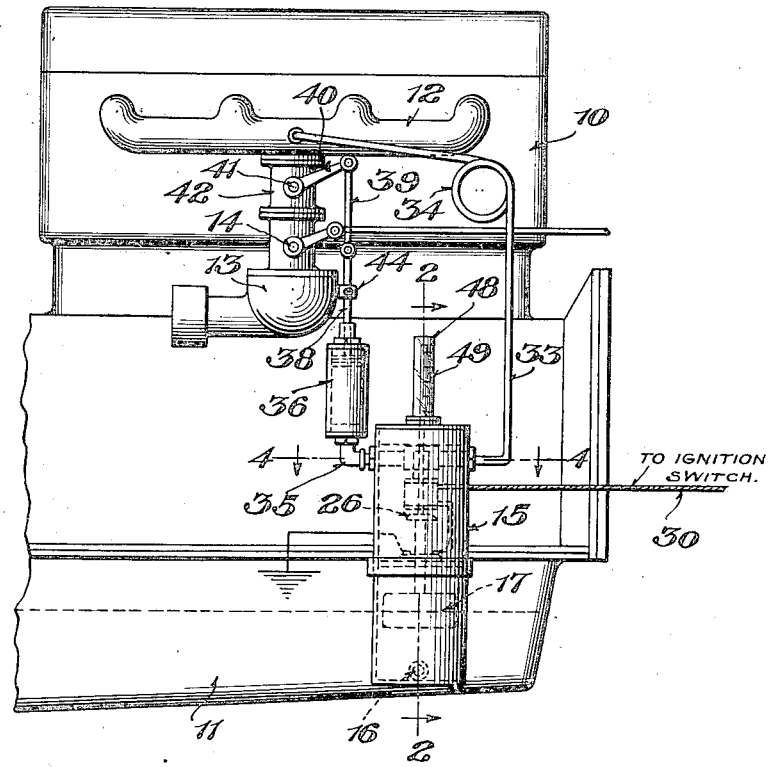
Figure 1 is a fragmentary side elevation of an internal combustion engine of conventional form having the device of this invention applied thereto.
Figure 4:
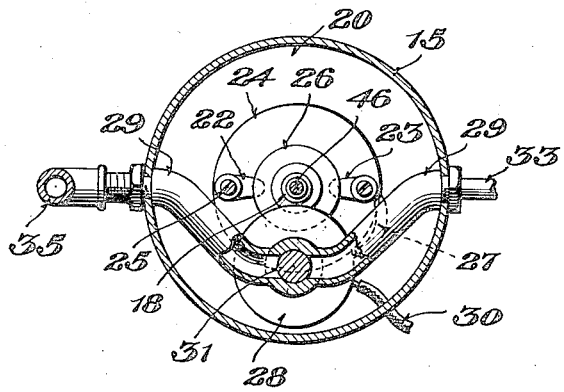
Figure 4 is a transverse section taken through the upper portion of the device on the line 4—4 of Figure 1.

Referring now to the drawings which show the application of one form of the invention as applied to an internal combustion engine, 10 designates generally the body of the engine, 11 the crank case thereof, while 12 designates the intake manifold to which is connected a suitable carbureter 13. The flow of the fuel mixture from the carbureter 13 to the manifold 12 is controlled in the usual manner by the conventional throttle valve 14, and these parts are operated in the usual manner independently of the present invention.

In the present embodiment of the invention, there is provided a casing or receptacle 15 which at its lower end is provided with a spud or connection 16 adapted to be threaded or otherwise suitably connected through the wall of the crank case 11 at a suitable low point for establishing surface level oil communication between the crank case 11 and the casing 15. In the lower portion of the casing 15 is disposed a float 17 adapted to rise and fall with the surface level of the oil in the crank case, and the float is provided with an upwardly extending stem 18, and the stem and the float may be hollow for the reception of a guide rod 19 suitably fixed to the bottom of the casing 15 and extending upwardly and centrally therein. The casing 15 carries intermediate its upper and lower ends a horizontal partition or support 20 of any suitable construction, and which may be mounted in any suitable manner in the casing such as by the screws 21 shown in the present instance.

The partition 20 is centrally apertured for slidably receiving the stem 18 of the float therethrough, and carries a pair of fixed contacts 22 and 23 at opposite sides of the stem 18 and which are mounted upon insulating blocks 24. The contact 22 is suitably grounded through its screw or rivet connection 25 with the partition 20, and the latter is of suitable electricity conducting material. The upper end of the stem 18 is provided with a movable contact or bridge member 26 of suitable construction to engage, when lowered, the contacts 22 and 23 for closing a circuit across the contacts.

The contact 23 is connected to one end of a wire 27 which leads to a magnet or solenoid 28 supported in the upper part of the casing 15 at the lower side of a pipe connection 29 which extends horizontally through the upper portion of the casing 15. The solenoid 28 is in circuit through a second wire 30 with the main engine circuit, preferably through the ignition controlling or main switch. The solenoid has a combined plunger and valve 31 which engages in a suitable valve way formed in the intermediate portion of the pipe connection 29 above the solenoid 28, and the plunger 31 is normally held in raised or closed position by an expanding spring 32 which may be disposed at the lower end of the plunger as shown. The plunger 31 is of suitable size to completely close or shut off the passage through the pipe connection 29 when the plunger is in raised position, and the solenoid 28 is of such size as to afford sufficient amplitude in the movement of the plunger when the solenoid is energized so as to establish free communication or passage through the pipe connection 29.

One end of the pipe connection 29 is connected by a tube 33, or the like, to the intake manifold 12 at a suitable point for establishing the desired suction in the pipe connection 29, and the tube 33 may be wound in a helix 34 to absorb vibration or any inequalities in the movement of the manifold and the casing 15 in the operation of the engine or the like.

The other end of the pipe connection 29 is connected by means of an elbow 35 with one end of a suction cylinder 36, and the latter carries a plunger or piston 37 having a plunger rod 38 which is connected through a link 39 with an arm 40 mounted on a supplemental throttle valve 41 which is disposed in the intake manifold in the engine. A separate housing or manifold section 42 may accommodate the supplemental throttle valve 41 and is interposed between the manifold 12 and the carbureter 13, or any other suitable structure may be resorted to. The plunger or piston 37 is normally and yieldably held in raised position by means of an expanding spring 43, which may be disposed within the lower end of the suction cylinder 36, or otherwise as found expedient in the manufacture and mounting of the device. The spring 43 is of sufficient tension only to maintain the arm 40 in raised position to hold the supplemental throttle valve 41 normally open.

In closing the supplemental throttle valve 41, it is a feature of the invention to maintain it from entirely closing and to adjustably determine the partially closed position of the throttle valve 41. The plunger rod 38 may be provided with a stop collar 44 secured by a set screw 45, or the like, in the desired adjusted position upon the plunger rod 38, the stop collar 44 adapted to engage the upper end or head of the suction cylinder 36. Any other suitable stop means may be substituted for this specifically disclosed embodiment.

The magnetic valve, comprising the solenoid 28 with its plunger 31 and the pipe connection 29 are offset to one side of the casing 15 from the axis of the casing. The float stem 18 carries an indicator rod 46 which extends upwardly through the top head 47 of the casing 15 and preferably into a transparent tube 48 of glass, or the like, which is mounted on the head 47. The tube 48 may be provided in any suitable manner with a scale of graduations 49 indicating various surface levels of oil in the crank case, and the rod 46 is proportioned as to length or otherwise suitably constructed with means cooperating with the scale 49 for indicating the height of the oil in the crank case. This transparent tube 48 with the indicator or gauge rod 46 is disposed, when the device is mounted, at the side of the motor in position for easy access to read the position of the rod 46, so that the oil level in the crank case may be readily observed by a mere glance at the upper end of the casing 15.

This device thus prevents the engine from running at a greater speed than that for which the device is adjusted, so that it positively prevents any damage to the engine parts incident to a greater speed than that which may be predetermined.

In operation, the supplemental throttle valve 41 is normally maintained opened by the spring 43, so that the device does not interfere in any way with the normal operation of the engine, when the surface level of the oil in the crank case is in its high or normal position. At the same time, the spring 32 in the magnetic valve holds the valve plunger 31 raised to close the passage through the pipe connection 29 so that suction in the manifold 12 is cut off from the suction cylinder 36, and the device thus remains dormant and inoperative during the normal surface level of the oil in the engine. At this time the float 17 is maintained raised in the casing 15 by the oil and the movable contact 26 is held raised above the fixed contacts 22 and 23 so that the circuit through the magnetic valve is maintained open.

As soon, however, as the surface level of the oil in the crank case 11, and in the casing 15, drops to a predetermined low level which is a dangerous level or low oil condition in the crank case, the float 17 drops and through its stem 18 draws the movable contact 26 into engagement with the fixed contacts 22 and 23, closing the circuit closer of the float and closing the circuit through the solenoid 28. The solenoid, thus engaged, draws the plunger valve 31 downwardly and opens the passage through the pipe connection 29 and establishes communication between the suction cylinder 36 and the intake manifold 12. The suction in the cylinder 36 draws the plunger or piston 37 toward the inner end of the cylinder 36 against the tension of the spring 43 so as to move the supplemental throttle valve 41 toward a closed position. This closing of the throttle valve 41 reduces the engine speed by reducing the amount of mixed fuel passing to the manifold 12. The low rate of speed or operation of the engine 10 may be regulated by adjusting the stop collar 44 so that when the device is operated the supplemental throttle valve 41 will be automatically closed to an extent sufficient to throttle down the speed of the motor to a safe speed proportionate to the amount of oil remaining in the crank case. It will be noted that by this adjustment the engine is not completely stopped but is merely limited as to its speed in operation when the oil reaches this low level. By adjusting the stop collar 44 the reduced speed of the engine may be set as desired so as to insure that the bearings and other parts of the motor will not be burned out or otherwise harmed. The low speed adjusting stop 44 may, of course, be set at a predetermined point at the installation of the apparatus so that the apparatus, with its various parts in the casing 15 is practically sealed against tampering with and will thus insure safety of the engine.

As soon as the required amount of oil is placed in the crank case, the float 17 is raised, breaking the circuit through the magnetic valve, and the spring 32 of the latter immediately raised the released plunger 31 and closes off suction between the intake manifold 12 and the suction cylinder 36. The spring 43 now returns the supplemental throttle valve 41 to normally open position. As the wire 30 is connected to the main or ignition switch controlling the engine, as soon as the switch is turned off to open the ignition circuit and stop the engine, the circuit is held open through the device and thus when the engine is not running and the ignition turned off there is no possibility of the circuit being closed through the various parts of this device.

It is obvious that various changes and modifications may be made in the details of construction and design of the above specifically described embodiment of this invention without departing from the spirit thereof, such changes and modifications being restricted only by the scope of the following claims.

What is claimed is:—

1. An oil level actuated engine speed controlling device comprising a normally open supplemental throttle valve adapted to be mounted in the intake of an internal combustion engine, means actuated by engine suction connected to the valve for closing the same at times, a second valve disposed between said means actuated by suction means and the intake manifold of the engine, magnetically actuated means for opening the second valve, and an oil level operated circuit closer disposed in the engine ignition circuit with said magnetically actuated means for closing said circuit and energizing the means to open the valve when the oil level in the engine drops to a predetermined degree.

2. An oil level actuated engine speed controlling device comprising normally open intake controlling means for the engine, a device actuated by engine suction for closing the intake controlling means and connected to said means and to the intake manifold of the engine, a normally closed valve arranged between said device and the manifold, magnetically actuated means for opening the valve, and a float operated switch arranged in the engine ignition circuit with said magnetically actuated means and operable by the drop in the surface level of the oil in the crank case to close the circuit and open said valve.

3. An oil level actuated engine speed controlling device comprising a supplemental throttle valve mounted in a normally open position in the intake manifold of the engine, a suction cylinder connected to the intake manifold of the engine, a plunger in the cylinder connected to said supplemental throttle valve for moving the same toward a closed position by suction in the suction cylinder, a normally closed valve disposed between the suction cylinder and the manifold for cutting off communication between the same, a magnetically actuated device for opening the last named valve, and an oil level operated device including a circuit closer connected in circuit with said magnetically actuated device for opening the valve when the oil level in the engine drops to a predetermined extent.

4. An oil level actuated engine speed controlling device comprising a normally open intake manifold valve, a plunger connected to the valve, a cylinder enclosing the plunger and connected to the intake manifold, a second valve between the cylinder and the manifold biased to a closed position to maintain the manifold valve open, a magnetically actuated device for opening the second valve, surface level oil operated means including a circuit closer disposed in circuit with the magnetically actuated device for actuating the valve when the surface level of oil in the crank case drops below a predetermined level to establish communication between the manifold and the cylinder and operate plunger therein, and adjustable stop means for the plunger to limit the movement thereof under engine suction of the manifold and for determining the partially closed position of said valve in the manifold.

5. An oil level actuated engine speed controlling device comprising a casing adapted for connection with a crank case to receive oil therefrom at a height equal to the surface level of the oil of the crank case, a float in said casing adapted to rise and fall with the rise and fall of the oil in the crank case, a suction cylinder mounted on the side of the casing, a pipe line leading from the suction cylinder through the upper portion of the casing and adapted for connection with the intake manifold of the engine to establish engine suction in the cylinder, a normally closed valve in the upper portion of the casing and in said pipe line for normally closing the suction cylinder from the manifold, a magnetically actuated device for opening the valve, a circuit closer connected to the float for operation upon the fall of the float through a predetermined distance and arranged in circuit with the magnetically actuated device to energize the same and open the valve in the pipe line, a plunger in the suction cylinder, and a normally open supplemental throttle valve adapted to be mounted in the intake manifold and connected to the plunger for closing the supplemental valve by operation of the plunger.

6. An oil level actuated engine speed controlling device comprising a casing adapted for connection with a crank case to receive oil therefrom at a height equal to the surface level of the oil of the crank case, a float in said casing adapted to rise and fall with the rise and fall of the oil in the crank case, a suction cylinder mounted on the side of the casing, a pipe line leading from the suction cylinder through the upper portion of the casing and adapted for connection with the intake manifold of the engine to establish engine suction in the cylinder, a normally closed valve in the upper portion of the casing and in said pipe line for normally closing the suction cylinder from the manifold, magnetically actuated means for the valve, a circuit closer connected to the float for operation upon the fall of the float through a predetermined distance and arranged in circuit with the magnetically actuated means to energize the same and open the pipe line, a plunger in the suction cylinder, a normally open supplemental throttle valve adapted to be mounted in the intake manifold and connected to the plunger for closing the supplemental valve by operation of the plunger, and an adjustable stop element disposed between the plunger and the cylinder for limiting the movement of the plunger under the suction action.

7. An oil level actuated engine speed controlling device comprising a casing adapted for oil level communication with the crank case of an engine, a float in the casing, a circuit closer in the ignition circuit connected to the float for operation when the float falls a predetermined distance, a suction cylinder, a pipe line leading from the suction cylinder through the upper portion of the casing and adapted for connection with the intake manifold of the engine to establish engine suction in the cylinder, a normally closed valve mounted in the casing and disposed in said pipe line to normally close it, a magnetically actuated device for the valve arranged in circuit with the circuit closer for opening the valve when the float drops and establishes communication between the manifold and the suction cylinder, movable means in the suction cylinder operable by engine suction in the manifold for closing the latter, and a normally open supplemental throttle valve connected to the movable means in the suction cylinder and adapted to be disposed in the manifold for closing the same to a desired extent when the float drops.

8. An oil level actuated engine speed controlling device comprising a casing adapted to be disposed in surface oil level communication with the crank case of an internal combustion engine, a float in said casing, a circuit closer in the ignition circuit connected to the float to be closed when the float drops with the surface of the oil level in the crank case, a suction cylinder adapted for connection with the intake manifold to establish engine suction in the cylinder, a normally closed valve disposed between the suction cylinder and the manifold, a magnetically actuated device for the opening valve disposed in circuit with said circuit closer, a plunger in the cylinder, a normally open throttle valve connected to the plunger and adapted to be disposed in the intake manifold, and adjustable stop means between the plunger and the suction cylinder to limit the closing of the supplemental throttle valve.

9. An oil level actuated engine speed controlling device comprising a casing adapted to be connected to a crank case for receiving oil therefrom at the surface level of the oil in the crank case, a float in the casing, a circuit closer in the ignition circuit connected to the float to be closed when the latter is lowered, a suction cylinder, a valve between the suction cylinder and the intake manifold of the engine, a magnetically actuated device for opening the valve disposed in circuit with the circuit closer, means for normally closing said valve, an engine speed limiting device adapted to be connected to the manifold of the engine and operable through said suction cylinder, an oil gauge rod connected to said float and extending upwardly through the cylinder, and a transparent enclosure mounted on the cylinder about the upper end of said rod for visual inspection of the height of said rod dependent upon the position of the float.

BENJAMIN C. ROLFE.